United States Patent [19]

Strauch et al.

[11] 4,191,670

[45] Mar. 4, 1980

[54] SURFACE-TREATED MINERAL FILLER

[75] Inventors: Dieter Strauch, Zofingen; Rüdiger Werner, Oftringen, both of Switzerland

[73] Assignee: Pluss-Staufer AG, Oftringen, Switzerland

[21] Appl. No.: 910,997

[22] Filed: May 30, 1978

[30] Foreign Application Priority Data

Jun. 21, 1977 [DE] Fed. Rep. of Germany ....... 2727845

[51] Int. Cl.$^2$ .......................... C08K 9/04; C09D 3/74; C09D 3/80
[52] U.S. Cl. ............................ 260/23 AR; 106/308 F; 260/23 S
[58] Field of Search .............. 106/308 F; 260/23 AR, 260/23 S

[56] References Cited

U.S. PATENT DOCUMENTS

| 1,832,417 | 11/1931 | O'Brien | 106/308 F |
|---|---|---|---|
| 1,946,052 | 2/1934 | Baldwin | 106/308 F |
| 2,077,167 | 4/1937 | Crouet | 106/308 F |
| 2,668,749 | 2/1954 | McHan | 106/308 F |
| 3,308,078 | 3/1967 | Rogers et al. | 260/23 AR |
| 3,547,847 | 12/1970 | Levine et al. | 260/23 AR |
| 3,940,385 | 2/1976 | Smith | 106/308 F |

FOREIGN PATENT DOCUMENTS

| 1047087 | 12/1953 | France | 106/308 F |
|---|---|---|---|
| 432032 | 7/1935 | United Kingdom | 106/308 F |
| 452734 | 8/1936 | United Kingdom | 106/308 F |

*Primary Examiner*—Ronald W. Griffin
*Attorney, Agent, or Firm*—Pollock, Vande Sande & Priddy

[57] ABSTRACT

Mineral filler surface treated with a mixture of saturated and unsaturated aliphatic acids, and use thereof.

35 Claims, No Drawings

SURFACE-TREATED MINERAL FILLER

BACKGROUND OF THE INVENTION

The present invention relates to surface-treated mineral fillers and method for the preparation thereof. The fillers are particularly suitable for making emulsion paints.

It is known to admix fillers, which are considered relatively cheap substances, to working materials such as paints, paper, plastic material and the like in order to increase their volume and/or weight. Also, fillers are often added to improve the usefulness of such materials.

The behavior of fillers in plastic materials, paints, and the like is decisively influenced by the nature of the filler surface. Attempts have therefore already been made to improve the properties of fillers by treating their surfaces with chemical substances.

For instance, German Pat. No. 958,830 suggests a method for treating natural calcium carbonate with surface-active materials wherein the calcium carbonate, in the presence of synthetic and natural fatty acids, amino-fatty acids, acid amides, fatty alcohols, waxes, and resins is ground up in quantities of between 0.1 and 40% at a temperature of at least 80° C. The problems to which said German patent are directed are to prevent the conglomeration of chalk particles and to facilitate the process of blending with plastic polymers and the like.

Surface-treated fillers suggested in the art possess more favorable properties when compared to untreated fillers. However, they still require considerable improvement particularly in terms of their practical technical properties.

An object of the present invention is to improve the properties of fillers and particularly the mechanical properties of relatively coarse fillers. One special purpose of the present invention is to provide a filler through surface treatment which can be used advantageously to make emulsion paints, and particularly to improve the wash and scrub resistance of the paints.

Over many years of comprehensive series of experiments, applicant investigated many groups of chemical substances and individual substances for their effectiveness as surface-treatment agents.

The following groups of substances, respectively, were tested for their effectiveness: silicones, cyclic esters, paraffin oil, polyethylene waxes, monocarboxylic acids (i.e., saturated or unsaturated fatty acids), saturated or unsaturated dicarboxylic acids, dicarboxylic acid esters, aromatic monocarboxylic acids, aromatic hydroxymonocarboxylic acids, polycyclic dicarboxylic acids, higher alcohols, amines, emulsifiable polymers, inorganic silicates, inorganic fluorosilicates, and wetting agents. None of the substances tested yielded an improvement in the wash and scrub resistance of emulsion paints that could be used in practice.

Surprisingly enough, however, it was discovered according to the invention that the problem can be solved by surface-treating the mineral filler with a mixture of saturated and unsaturated aliphatic acids.

It is particularly surprising that the use of the mixtures consisting of saturated and unsaturated aliphatic acids provided the advantages achieved according to the present invention since the use of saturated or unsaturated acids alone did not provide any noteworthy improvements.

SUMMARY OF INVENTION

The present invention is concerned with mineral fillers surface treated with a mixture of saturated and unsaturated aliphatic carboxylic acids.

The present invention is also concerned with a method for preparing the filler which includes grinding the filler in a mill with microgrinding bodies in the presence of the above mixture of acids and in the presence of a dispersing agent. The present invention is also concerned with another method for preparing the filler which includes grinding the filler and subsequently treating it by adding the above mixture of acids.

The present invention is also concerned with the use of the surface-treated fillers to prepare watery paint systems.

DESCRIPTION OF PREFERRED EMBODIMENTS

It has been found according to the present invention that mixtures of saturated and unsaturated aliphatic carboxylic acids in the surface treatment of mineral fillers provide improved fillers. The carboxylic acids can be straight chained or branched chained and are preferably straight chained. Also, the acids employed are preferably monocarboxylic. The acids employed according to the present invention generally have from about 6 to about 22 carbon atoms, preferably from about 12 to about 20 carbon atoms, and most preferably from 16 to 18 carbon atoms. The acids employed should be free of substituents other than carbon, hydrogen, and the carboxylic acid grouping.

Examples of some saturated acids include lauric acid, myristic acid, stearic acid, and palmitic acid. Mixtures of individual saturated acids can be employed if desired as the saturated acid component. The unsaturated aliphatic acid can be monoethylenically unsaturated and/or polyunsaturated. Mixtures of individual unsaturated acids can be employed as the unsaturated acid component if desired. Examples of some suitable unsaturated aliphatic acids include oleic acid, linoleic acid, and linolenic acid.

One advantageous aspect of the present invention is that the filler can be surface-treated with naturally occurring mixtures of saturated and unsaturated fatty acids. For instance, the fatty acids obtained for instance by hydrolysis from such oils as safflower oil, soybean oil, poppyseed oil, and sunflower oil can be used in the present invention.

Soybean fatty acids are particularly advantageous as a surface-treating agent. Soybean fatty acids consist essentially of linoleic acid, oleic acid, palmitic acid, stearic acid, and linolenic acid.

The mixture of acids employed generally contains from about 10 to 35% by weight of the saturated aliphatic acid component and from about 65 to about 90% by weight of the unsaturated aliphatic acid component. The preferred acid mixtures contain palmitic acid, stearic acid, oleic acid, linoleic and optionally linolenic acid, and preferably in the following amounts by weight:

palmitic acid—about 5 to about 20%,
stearic acid—about 5 to about 15%
oleic acid—about 20 to about 50%
linoleic acid—about 30 to about 70%
linolenic acid—0 to about 10%

According to the present invention, the best results were obtained with a soybean fatty acid made up of 53.0% by weight of linoleic acid, 24.0% by weight of oleic acid, 12.0% by weight of palmitic acid, 6.0% by weight of stearic acid, and 5.0% by weight of linolenic acid.

The materials treated according to the present invention include the mineral or inorganic fillers and include natural, precipitated and/or pyrolytic produced fillers. Examples of some suitable fillers include natural and precipitated carbonates including natural and precipitated calcium carbonate and dolomite, natural and precipitated barium sulfate, and natural, precipitated and/or pyrolytic produced silica such as quartz dust and compounds of silica such as the silicates and including kaolin, mica, and talcum. Particularly favorable results were obtained with marble dust as filler.

The fillers employed generally have a particle size range of about 0.1 to about 100 μm and preferably a particle size range between about 0.5 and about 25 μm.

The relative amounts of filler and surface treatment agent (i.e., mixture of acids) is generally about 90.0 to 99.9% by weight of filler and correspondingly 0.1 to about 10.0% by weight of surface treatment agent, is preferably about 97 to 99.9% by weight of filler and correspondingly 0.1 to about 3% by weight of surface treatment agent, and most preferably is 99.0% to about 99.8% by weight of filler and correspondingly 0.2 to 1% by weight of surface treatment agent. A weight ratio of 99.4% by weight of filler and 0.6% by weight surface treatment agent proved to be particularly advantageous.

According to the present invention, the surface-treated minerals are either made by grinding up the filler in the presence of an organic or inorganic dispersion agent in a mill with micro grinding bodies in the presence of the surface treatment agent or the filler is obtained by grinding and is then surface treated.

The surface treatment agent can be added by heating it, if needed, to temperatures within the range of about 20° to about 80° C., and by spraying and/or using fluid mixers (e.g., mixing or kneading mechanisms).

It was found that mineral fillers, surface treated according to the present invention, are particularly suitable for making watery paint systems and particularly for the production of emulsion paints. Outstanding results were achieved in the production of emulsion paints based on styrene-acrylate copolymer dispersions as binders. Examples of some polymers to which the treated fillers can be added include polymers from monoethylenically unsaturated compounds such as polyvinylacetate, acrylate polymers including ethyl acrylate and methyl acrylate, copolymers of vinyl acetate and esters of acrylic acid, copolymers of vinyl acetate and vinyl ester of versatic acid, copolymers of vinyl propionate and esters of acrylic acid, copolymers of styrene and esters of acrylic acid, copolymers of styrene and butadiene, and terpolymers of vinyl acetate, vinyl ester of versatic acid, and esters of acrylic acid.

In wash-resistant interior emulsion paints, an untreated calcium carbonate (particle size range between 0.5 and 25 μm) demonstrated a washing resistance of 1,100–1,400 cycles, measured according to DIN [German Industrial Standard] 53778. For a discussion of the minimum requirements of synthetic emulsion paints for interior use, see DIN 53778, Part 1, September 1976, disclosure of which is incorporated herein by reference. The same interior emulsion paint, containing the same calcium carbonate as filler except that it was surface-treated according to the present invention, on the other hand, quite surprisingly, gave a washing resistance of 20,000–22,000 cycles. For the surface treatment, 0.6% soybean fatty acid was used. In a scrub-resistant interior emulsion paint, it was possible to increase the number of scrub cycles, by means of the surface treatment of calcium carbonate according to the present invention, from the original 5,000 to more than 65,000.

The increase in wash and scrub resistance as a result of this invention in practice particularly facilitates a qualitative improvement in the dispersion paints with constant binder content or an increase in the economy through binder reduction with practically unchanged wash or scrub resistance. Thus, for example, the binder quantity can be reduced in washproof interior paints from 10.0% to 8.0%, in other words, a 20% reduction. In scrub-proof interior paints, the binder can be reduced from 12.0% down to 9.5%, that is to say, by about 21%. This binder reduction, coupled with the same final product quality, signifies a considerable cost reduction.

Furthermore, the present invention provides the following advantages. It is more waterproof and thus more weather-proof; reduced swellability. Improved sprayability and free flow properties of the powder for easier bulk handling and thus easier silo storage and pneumatic conveyance. Smaller bulk volume. Smaller space requirement during storage. Less dust generation. Less dust pollution. Simple dispersion in watery media due to lesser inclination toward agglomerate formation. Greater surface smoothness of paint film and less scratch and dirt sensitivity. Film surface can be easily cleaned due to slight hydrophobia.

The following examples are presented to further illustrate the present invention wherein marble dust surface-treated in accordance with the present invention is compared to untreated marble dust in emulsion paints with regard to wash and scrub resistance.

EXAMPLE 1

In a fluid mixer, 994 parts by weight of a marble dust having particle size range between 0.5 and 25 μm were preheated to a temperature of 40° C. Thereafter, 6 parts by weight of soybean fatty acids, preheated to 40° C. where slowly sprayed onto the marble dust. The temperature rose to 80° C.

The above surface-treated marble dust was tested for wash resistance according to DIN 43778 and was compared to an untreated marble dust having the same particle size range in a wash-proof emulsion paint of the composition given below. The surface-treated marble dust, made according to the present invention, was examined for wash resistance both with the use of 10% by weight and 8% by weight emulsion containing as binder a styrene-acrylate copolymer.

| Test Composition | Parts by Weight |
|---|---|
| Water | 83.0 |
| Sodium-hexametaphosphate, 10% | 17.0 |
| Dispersing agent on acrylate base | 3.0 |
| Soda lye, 10% | 1.0 |
| In can preservative | 1.0 |
| Defoamer | 1.0 |
| Cellulose ether, 2% | 225.0 |
| Butyldiglycolacetate | 3.0 |
| White spirit | 10.0 |
| Titanium dioxide rutile | 71.0 |
| Micro-talcum | 50.0 |
| Marble dust | 435.0 |
| Styrene-acrylate copolymer emulsion, 50% (commercially | |

-continued available as Mowilith DM 60 from Hoechst Dye Plant, Incorporated. For a further discussion of Mowilith DM 60 see the Bulletin by Hoechst Dye Plant, Incorporated entitled Mowilith DM 60 about 50%, February 1974, 86719, G1051 ... 100.0

1,000.0

Experiment 1: Untreated marble dust
Experiment 2: Marble dust surface-treated according to the present invention
Experiment 3: Marble dust, surface-treated according to the present invention, with simultaneous reduction of styrene-acrylate copolymer emulsion from 10% down to 8% by weight.

Washing Resistance According to DIN 53 778

| Experiments | Scrub Cycles |
| --- | --- |
| 1 | 1,100–1,400 |
| 2 | 20,000–22,000 |
| 3 | 1,800–2,100 |

EXAMPLE 2

Marble dust, with a particle size range of 0.5–25 μm, is surface treated in accordance with Example 1. Comparative tests were carried out with an untreated marble dust having the same grain size range in a scrub-resistant emulsion paint, of the following composition.

The surface-treated marble dust, prepared according to the present invention, was tested for scrub resistance both with the use of 12% and 9.5% by weight styrene-acrylate copolymer emulsion.

| Test Composition | Parts by Weight |
| --- | --- |
| Water | 63.5 |
| Sodium-hexametaphosphate, 10% | 17.0 |
| Dispersing agent on acrylate base | 3.0 |
| Soda lye, 10% | 1.5 |
| In can preservative | 1.0 |
| Defoamer | 1.0 |
| Cellulose ether, 2% | 225.0 |
| Butyldiglycolacetate | 4.0 |
| White Spirit | 7.0 |
| Titanium dioxide rutile | 200.0 |
| Micro-talcum | 62.0 |
| Marble dust | 295.0 |
| Styrene-acrylate emulsion, 50% | 120.0 |
| | 1,000.0 |

Experiment 1: Untreated marble dust
Experiment 2: Surface-treated marble dust made according to the present invention
Experiment 3: Surface-treated marble dust made according to the present invention with simultaneous reduction of the styrene-acrylate-emulsion from 12 down to 9.5% by weight.

Scour Resistance According to DIN 53 778

| Experiments | Scour Cycles |
| --- | --- |
| 1 | 4,800–5,300 |
| 2 | >65,000 |
| 3 | 5,500–6,000 |

The surface-treated fillers of the present invention were also employed in emulsion paints with the following polymers resulting in the following improvement in scrub resistance when compared to the same filler except being untreated.

| Polymer | Improvement % |
| --- | --- |
| Polyvinyl acetate | 100 |
| Polyacrylate | 100 |
| Copolymer of vinyl acetate and vinyl ester of versatic acid | 240 |
| Copolymer of vinyl acetate and acrylic acid ester | 150 |
| Copolymer of vinyl propionate and acrylic acid ester | 300 |
| Copolymer of styrene and acrylate | 1,000–2,000 |
| Copolymer of styrene and butadiene | 1,000–2,000 |
| Terpolymer of vinyl acetate, vinyl ester of versatic acid, and acrylic acid ester | 60 |

What is claimed is:

1. Surface-treated mineral filler characterized by the fact that the filler is surface treated with a mixture of saturated and unsaturated aliphatic carboxylic fatty acids, having from about 6 to 22 carbon atoms, and wherein said mixture contains about 10 to about 35% by weight of said unsaturated acid and from about 65 to about 90% by weight of said unsaturated acid.

2. The surface-treated mineral filler of claim 1 wherein 99.4% by weight is said filler and 0.6% by weight is said surfact treatment agent.

3. The surface-treated mineral filler of claim 1 wherein said acids have from about 12 to about 20 carbon atoms.

4. The surface-treated mineral filler of claim 1 wherein said acids have from about 16 to about 18 carbon atoms.

5. The surface-treated mineral filler of claim 1 wherein said filler is surface treated with a fatty acid mixture selected from the groups of safflower oil fatty acids, soybean oil fatty acids, poppyseed oil fatty acids, and sunflower seed oil fatty acids.

6. The surface-treated mineral filler of claim 1 wherein said mixture is soybean oil fatty acids.

7. The surface-treated mineral filler of claim 1 wherein said mixture contains the following in percent by weight: 53% linoleic, 24.0% oleic acid, 12.0% palmitic acid, 6.0% stearic acid, and 5.0% linolenic acid.

8. The surface-treated mineral filler of claim 1 wherein said mixture contains about 5 to about 20% by weight of palmitic acid, about 5 to 15% by weight of stearic acid, about 20 to about 50% by weight of oleic acid, about 30 to about 70% by weight of linoleic acid, and 0 to about 10% by weight of linolenic acid.

9. The surface-treated mineral filler of claim 1 wherein said filler is selected from the group consisting of natural fillers, precipitated filler, pyrolytic fillers, and mixtures thereof.

10. The surface-treated mineral filler of claim 1 wherein said filler is selected from the group consisting of calcium carbonate, dolomite, kaolin, barium-sulfate, mica, talcum, quartz dust, and mixtures thereof.

11. The surface-treated mineral filler of claim 1 wherein said filler is marble dust.

12. The surface-treated mineral filler of claim 1 wherein said filler has a particle size range of 0.1–100 microns.

13. The surface-treated mineral filler of claim 1 wherein said filler has a particle size in the range of 0.5–25 microns.

14. The surface-treated mineral filler of claim 1 wherein 90.0–99.9% by weight is said filler and 0.1–10.0% by weight is said surface treatment agent.

15. The surface-treated mineral filler of claim 1 wherein 99.4–99.9% by weight is said filler and 0.1–0.6% by weight is said surface treatment agent.

16. Method for making a surface-treated mineral filler of claim 1 wherein the filler is ground up in the presence of a dispersing agent in a mill with microgrinding bodies in the presence of said surface treatment agent.

17. The method for making the surface-treated mineral filler of claim 1 wherein the filler is made by grinding and the surface treatment agent is subsequently added by spraying or by fluid mixing or by both.

18. A watery paint system which contains a binder and a surface-treated mineral filler characterized by the fact that the filler is surface treated with a mixture of saturated and unsaturated aliphatic carboxylic fatty acids having from about 6 to about 22 carbon atoms, and wherein said mixture contains about 10 to about 35% by weight of said saturated acid and from about 65 to about 90% by weight of said unsaturated acid.

19. The paint system of claim 18 wherein said binder includes a polymer which is polyvinylacetate, or acrylate polymer, or copolymer of vinyl acetate and ester of acrylic acid, or copolymer of vinyl acetate and vinyl ester of versatic acid, or copolymer of vinyl propionate and ester of acrylic acid, or copolymer of styrene and ester of acrylic acid, or copolymer of styrene and butadiene or terpolymer of vinyl acetate, vinyl ester of versatic acid and ester of acrylic acid.

20. The paint system of claim 18 wherein said acids have from about 12 to about 20 carbon atoms.

21. The paint system of claim 18 wherein said acids have from about 16 to about 18 carbon atoms.

22. The paint system of claim 18 wherein said filler is surface treated with a fatty acid mixture selected from the groups of safflower oil fatty acids, soybean oil fatty acids, poppyseed oil fatty acids, and sunflower seed oil fatty acids.

23. The paint system of claim 18 wherein said mixture is soybean oil fatty acids.

24. The paint system of claim 18 wherein said mixture contains the following in percent by weight: 53% linoleic, 24.0% oleic acid, 12.0% palmitic acid, 6.0% stearic acid, and 5.0% linolenic acid.

25. The paint system of claim 18 wherein said mixture contains about 5 to about 20% by weight of palmitic acid, about 5 to 15% by weight of stearic acid, about 20 to about 50% by weight of oleic acid, about 30 to about 70% by weight of linoleic acid, and 0 to about 10% by weight of linolenic acid.

26. The paint system of claim 18 wherein said filler is selected from the group of natural fillers, precipitated filler, pyrolytic fillers, and mixtures thereof.

27. The paint system of claim 18 wherein said filler is selected from the group of calcium carbonate, dolomite, kaolin, barium-sulfate, mica, talcum, quartz dust, and mixtures thereof.

28. The paint system of claim 18 wherein said filler is marble dust.

29. The paint system of claim 18 wherein said filler has a particle size range of 0.1–100 microns.

30. The paint system of claim 18 wherein said filler has a particle size in the range of 0.5–25 microns.

31. The paint system of claim 18 wherein 90.0–99.9% by weight is said filler and 0.1–10.0% by weight is said surface treatment agent.

32. The paint system of claim 18 wherein 99.4–99.9% by weight is said filler and 0.1–0.6% by weight is said surface treatment agent.

33. The paint system of claim 18 wherein 99.4% by weight is said filler and 0.6% by weight is said surface treatment agent.

34. The paint system of claim 18 wherein said system is an emulsion paint.

35. The paint system of claim 18 wherein said emulsion paint is based on a polymer of styrene and an acrylate.

* * * * *